United States Patent
Bateman et al.

(10) Patent No.: US 8,698,015 B2
(45) Date of Patent: Apr. 15, 2014

(54) COMPENSATING FOR MULTI-TOUCH SIGNAL BIAS DRIFT IN TOUCH PANELS

(75) Inventors: Steven S. Bateman, Portland, OR (US); David L. Graumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 12/642,090

(22) Filed: Dec. 18, 2009

(65) Prior Publication Data
US 2011/0147101 A1   Jun. 23, 2011

(51) Int. Cl.
*G06F 3/044* (2006.01)
(52) U.S. Cl.
USPC ............... 178/18.06; 178/17 D; 178/19.03
(58) Field of Classification Search
USPC ............ 178/18.06, 19.03, 17 D; 345/173; 382/305; 358/474; 250/208.1, 214, 250/208.2
See application file for complete search history.

(56) References Cited

U.S. PATENT DOCUMENTS

| | | | |
|---|---|---|---|
| 6,452,514 B1 | 9/2002 | Philipp | |
| 7,265,331 B2 * | 9/2007 | Muenter et al. | 250/208.2 |
| 7,315,013 B2 * | 1/2008 | Siah et al. | 250/208.1 |
| 7,565,034 B2 * | 7/2009 | Siah et al. | 382/305 |
| 8,026,904 B2 * | 9/2011 | Westerman | 345/173 |
| 8,350,821 B2 * | 1/2013 | Land et al. | 345/173 |
| 2005/0281466 A1 * | 12/2005 | Siah et al. | 382/199 |
| 2006/0113459 A1 * | 6/2006 | Yang et al. | 250/208.1 |
| 2006/0126127 A1 * | 6/2006 | Stanback et al. | 358/474 |
| 2006/0180746 A1 * | 8/2006 | Muenter et al. | 250/214 R |
| 2008/0047764 A1 * | 2/2008 | Lee et al. | 178/18.06 |
| 2010/0170726 A1 * | 7/2010 | Yeh et al. | 178/19.03 |

FOREIGN PATENT DOCUMENTS

| | | |
|---|---|---|
| CN | 101583923 A | 11/2009 |
| KR | 10-0695630 B1 | 3/2007 |
| KR | 10-2009-0087351 A | 8/2009 |
| KR | 10-2009-0088020 A | 8/2009 |
| KR | 10-2009-0107049 A | 10/2009 |
| WO | 2011/075230 A2 | 6/2011 |
| WO | 2011/075230 A3 | 11/2011 |

OTHER PUBLICATIONS

International Search Report and Written Opinion received for PCT Patent Application No. PCT/US2010/055272, mailed on Jul. 29, 2011, 8 pages.
International Preliminary Report on Patentability and Written Opinion received for PCT Patent Application No. PCT/US2010/055272, mailed on Jun. 28, 2012, 5 pages.
Office Action received for Chinese Patent Application No. 201010616894.9, mailed on Dec. 5, 2012, 3 pages of English Translation, 2 pages of Search Report and 6 pages of Chinese Office Action.

* cited by examiner

*Primary Examiner* — Thuy Pardo
(74) *Attorney, Agent, or Firm* — Sutherland Asbill & Brennan LLP

(57) ABSTRACT

A system and method provide for selecting a sensor in an array of capacitive sensors, determining a row intensity for the selected sensor, and determining a column intensity for the selected sensor. The system and method may also provide for compensating the selected sensor for multi-touch signal bias drift, wherein the compensating may include adjusting an intensity of the selected sensor based on the row and column intensity.

18 Claims, 5 Drawing Sheets

COMPENSATING FOR MULTI-TOUCH SIGNAL BIAS DRIFT IN TOUCH PANELS

BACKGROUND

1. Technical Field

Embodiments generally relate to touch panels. More particularly, embodiments relate to compensating for multi-touch signal bias drift in projected capacitance touch panels.

2. Discussion

Touch panels can be deployed as user interfaces (UIs) in a wide variety of situations. When using projected capacitance touch panels on large horizontal surfaces such as the keyboard surface of a notebook computer, the user may rest larger body masses on the panel. In this case, the ability to stabilize the capacitive circuitry can become a challenge. For example, the touch signal of interest may fade, drift, and in many cases vanish below detectable levels due to the fact that the user's body may be coupling a capacitive charge from one part of the panel into another part of the panel.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a touch panel having an array of capacitive sensors and an adjustment module to compensate each sensor in the array for multi-touch signal bias drift.

Embodiments can also provide for a computing system having a housing with a notebook form factor and a touch panel coupled to a horizontal surface of the housing. The touch panel may include an array of capacitive sensors and an adjustment module to compensate each sensor in the array for multi-touch signal bias drift.

In addition, embodiments may include a method of operating a touch panel. The method can provide for selecting a sensor in an array of capacitive sensors and determining a row intensity for the selected sensor. A column intensity may also be determined for the selected sensor. The method can further provide for compensating the selected sensor for multi-touch signal bias drift, wherein the compensating includes adjusting an intensity of the selected sensor based on the row intensity and column intensity.

Figure 1:
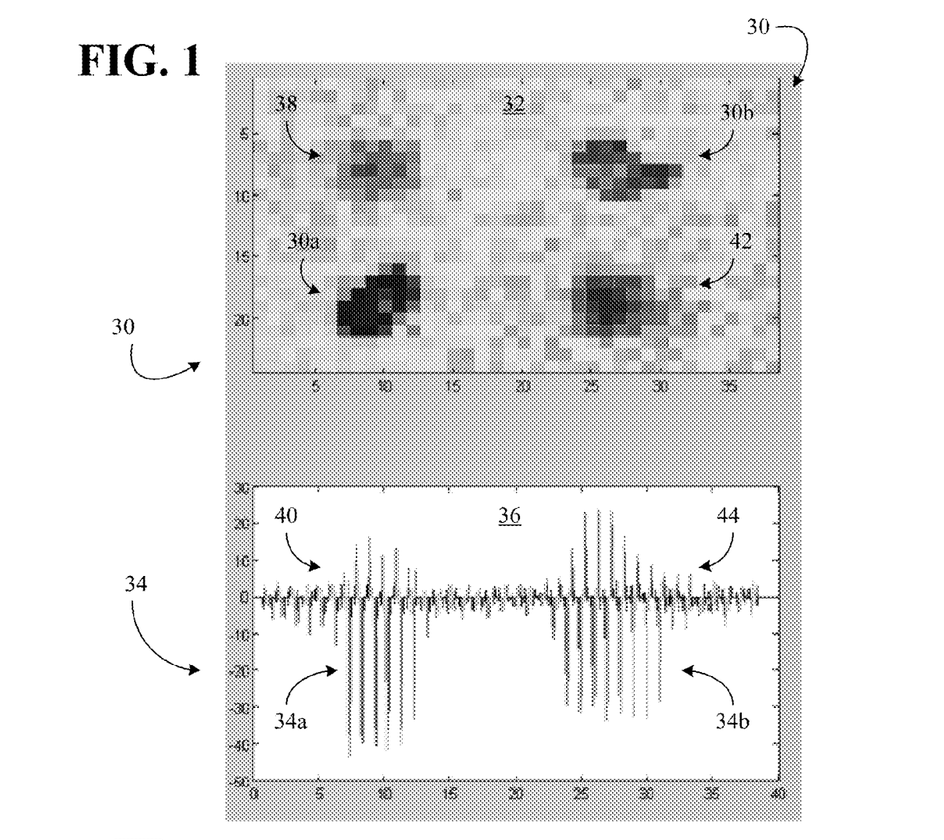
FIG. 1 is a diagram of an example of a multi-touch signal bias phenomenon.

Turning now to FIG. 1, an example touch panel array 32 of projected capacitance sensors/cells is shown. Readings can be made by passing an alternating current (AC) waveform through each capacitive sensor in the array 32, wherein bringing a body part or conductive stylus close to the surface of the sensor can change the local electrostatic field. The capacitance change at each sensor in the array 32 can be measured to determine the touch location. In the illustrated example, two regions 30 (30a, 30b) of the array 32 have been touched by a user. The leftmost touched region 30a might correspond to the user's left palm and the rightmost touched region 30b could correspond to the user's right palm. The touched regions 30 can therefore be considered together as being associated with a "multi-touch" event.

The touched regions 30 may generally result in intensity readings 34 (34a, 34b) shown beneath the array 32 in chart 36. Typically, touches render negative magnitude readings in projected capacitance touch panel architectures. In particular, the touched region 30a may result in an intensity reading 34a, and the touched region 30b may result in the intensity reading 34b. It has been determined that the amount of charge introduced back into the array 32 due to a multi-touch may be a function of the row and column coupling into the body, and the relationship of those rows and columns to other touch points being scanned. In particular, a row touched by one hand and a column touched by another hand can reduce panel sensitivity at the intersection of that row and column. Thus, an intersection region 38 may occur at the row of the touched region 30b and the column of the touched region 30a, wherein the intersection region 38 can experience a bias drift 40 for that location. Accordingly, in order for a touch at intersection region 38 to register as a touch, it would have to overcome the positive magnitude of the bias drift 40. The bias drift 40 may be due to a capacitive charge being coupled from one part of the array 32, through the user's body, and into another part of the array 32. Similarly, an intersection region 42 may occur at the column of the touched region 30b and the row of the touched region 30a, wherein the illustrated intersection region 42 experiences a bias drift 44 for that location. Thus, the intersection region 42 may also be "desensitized" as a result of the multi-touch.

Figure 2:
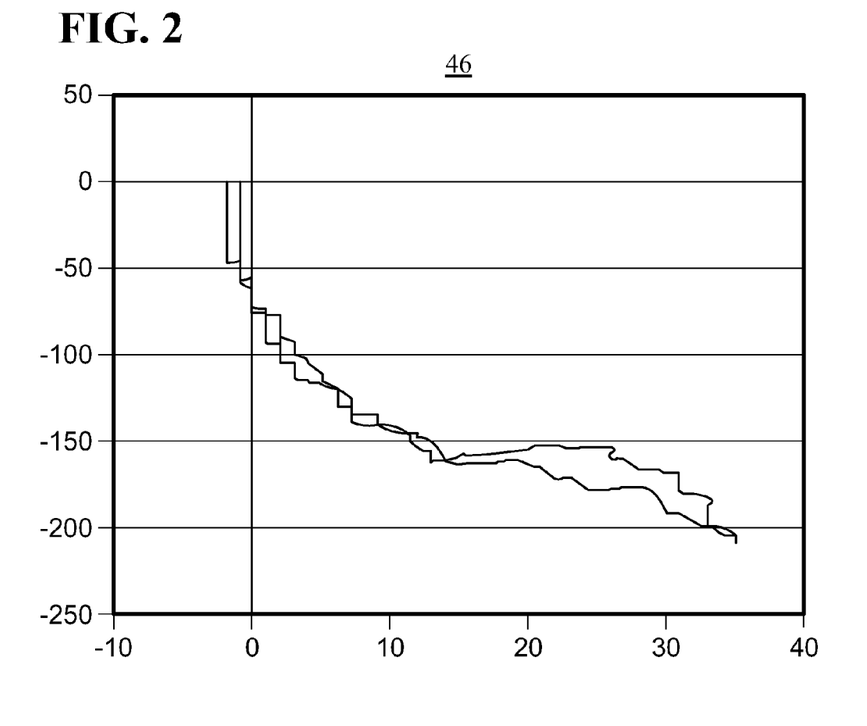
FIG. 2 is a plot of an example of an intensity summation for an uncompensated sensor.

FIG. 2 shows a plot 46 of the summation of all weighted intensities of the column and row of a target sensor of x=14 and y=15 in a 38×24 (8 mm cell size) touch panel. The illustrated intensity fades from 0 to +30 as the row and column charges build up. Had a touch of the targeted sensor [14, 15] occurred, this +30 build up would have overwhelmed the draining of the touch and no contact would be registered.

Accordingly, a dynamic adjustment to the individual sensors may be made in order to compensate for multi-touch signal bias drift, wherein the adjustment is a function of the row and column drain of the sensor in question. One approach to such compensation may be to determine the row intensity for the selected sensor, determine the column intensity for the selected sensor, and adjust the intensity of the selected sensor based on the row and column intensities. For example, the magnitude of the bias adjustment may be calculated as follows.

$$\gamma = \sum_{i=0}^{T^x-1} \omega_i^x I_{i,T^y} + \sum_{l=0}^{T^y-1} \omega_l^y I_{T^x,l} \quad (1)$$

where I represents sensor intensity (e.g., in Volts), T represents the index to the selected sensor, and ω represents a scalar weight as a function of index (e.g., distance to the selected sensor). Thus, the first term on the right-hand side of the equation calculates a column intensity sum for sensors in the column containing the selected sensor, and the second term on the right-hand side of the equation calculates a row intensity sum for sensors in the row containing the selected sensor. In the illustrated example, the row and column intensity sums are weighted. In particular, the weights applied to the individual intensities may be inversely proportional to the distance to the selected sensor so that sensors closer to the target sensor are weighted more heavily. In addition, the illustrated row and column intensity sums include only the sensors between the selected sensor and the charge/read circuitry of the controller hardware (typically, the [0,0] location of the array). Alternatively, the entire row and column may be used.

Figure 3:
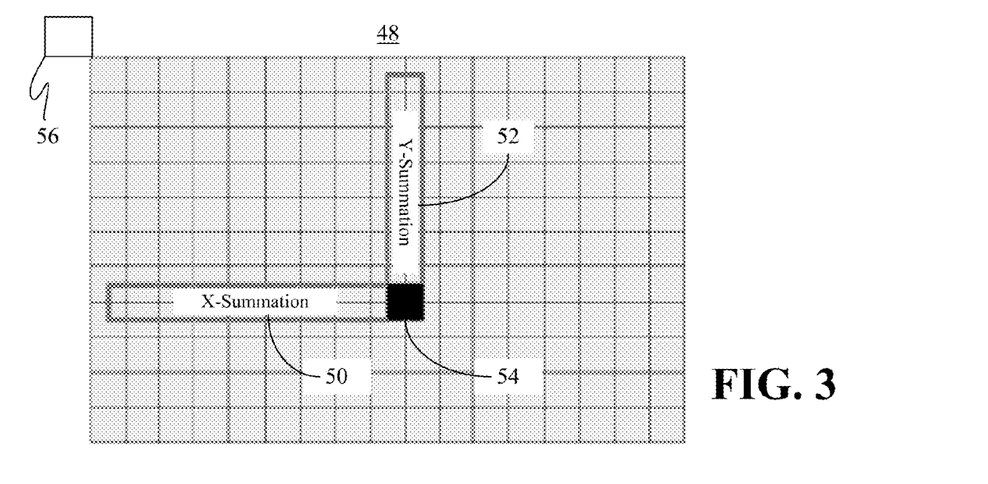
FIG. 3 is a grid of an example of an intensity summation sensor map according to an embodiment.

FIG. 3 shows a grid of an example of an intensity summation sensor map 48 in which the row intensity sum sensors 50 are between the selected sensor 54 and the charge/read circuitry 56 in the row containing the selected sensor 54. Similarly, the column intensity sum sensors 52 may be between the selected sensor 54 and the charge/read circuitry 56 in the column containing the selected sensor 54.

Each original sensor intensity can therefore be linearly adjusted by gamma as:

$$I_{T_x,T_y}^f = I_{T_x,T_y}^o + \gamma \quad (2)$$

where $I^o$ represents the original sensor intensity and $I^f$ represents the final sensor intensity. This equation can be repeated for all sensors of interest on the panel.

Figure 4:
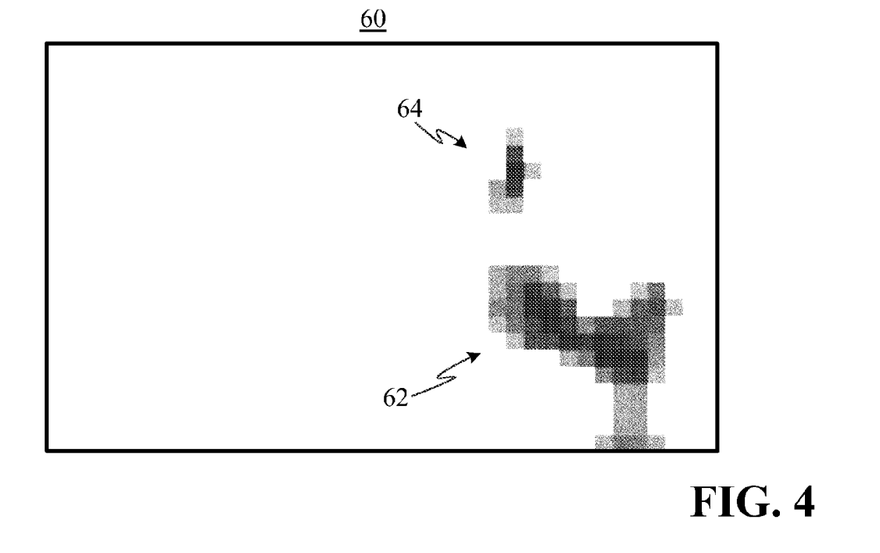
FIG. 4 is a diagram of an example of a reading from a touch panel having contact from a right hand with a detectable thumb according to an embodiment.
Figure 5:
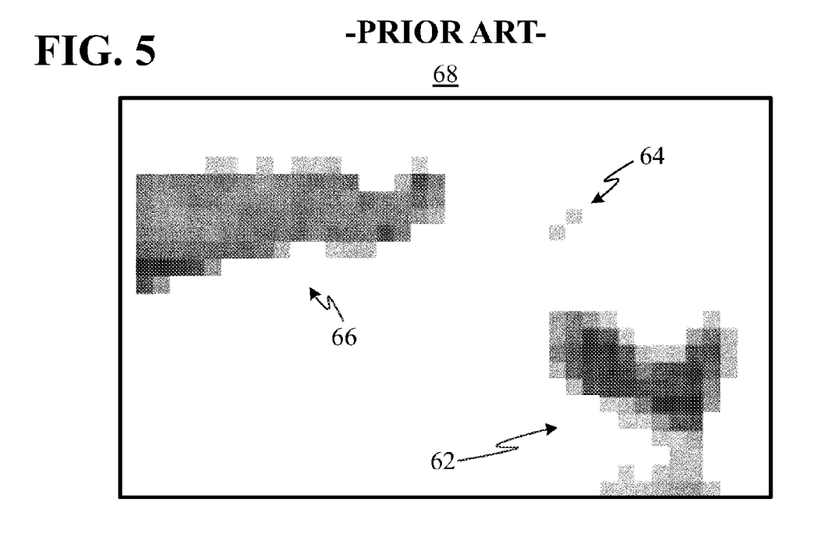
FIG. 5 is a diagram of an example of a conventional reading from a touch panel having contact from a left forearm and a right hand with an undetectable thumb.
Figure 6:
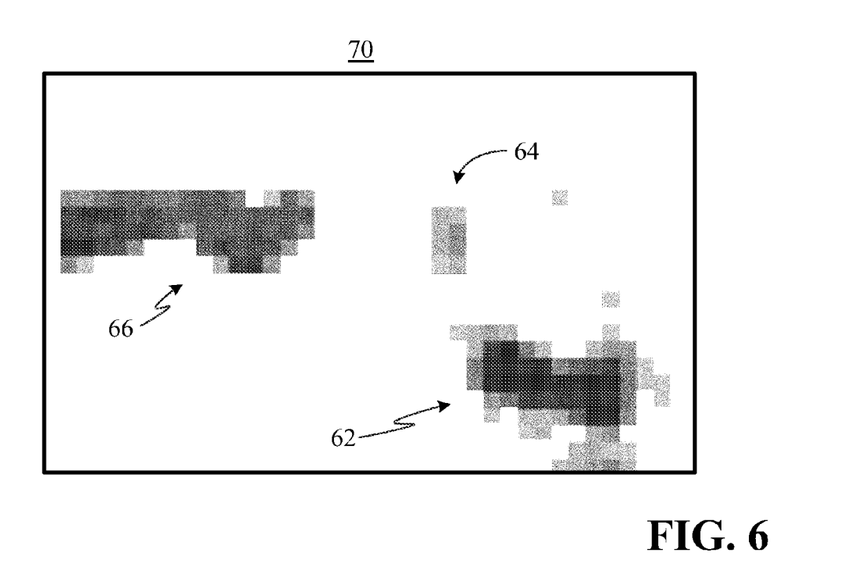
FIG. 6 is a diagram of an example of a reading from a touch panel having contact from a left forearm and a right hand with a detectable thumb according to an embodiment.

Turning now to FIG. 4, an example of a reading 60 from a touch panel is shown. In the illustrated example, a palm region 62 corresponds to a right palm of a user and a thumb region 64 corresponds to a right thumb of the user. The thumb region 64 is detectable. FIG. 5 shows, however, a similar reading 68 with an additional forearm region 66. In this case, the thumb region 64 has faded significantly in intensity due to a lack of compensation. The result may be a missed detection of an event and/or deteriorated performance. FIG. 6 shows a reading 70 taken with the above-described multi-touch signal bias drift compensation. The illustrated result shows that the thumb region 64 is detected.

Figure 7:
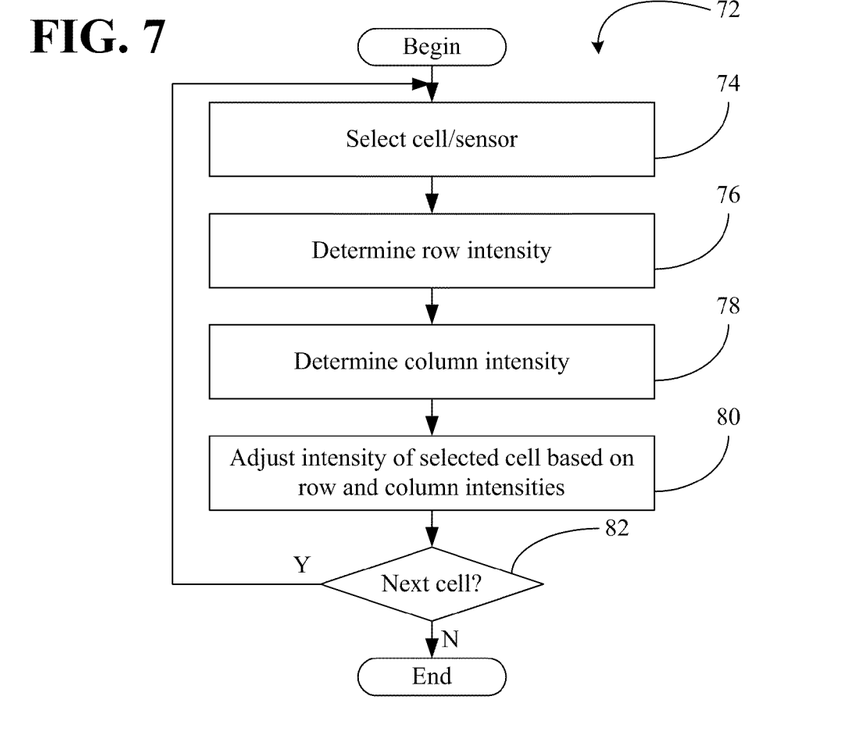
FIG. 7 is a flowchart of an example of a method of operating a touch panel according to an embodiment.

FIG. 7 shows a method 72 of operating a touch panel in real-time. The method 72 may be implemented in executable software as a set of logic instructions stored in a machine- or computer-readable medium of a memory such as random access memory (RAM), read only memory (ROM), programmable ROM (PROM), flash memory, etc., in fixed-functionality hardware using circuit technology such as application specific integrated circuit (ASIC), complementary metal oxide semiconductor (CMOS) or transistor-transistor logic (TTL) technology, or any combination thereof.

Processing block 74 provides for selecting a cell/sensor of an array of capacitive sensors. A row intensity for the selected sensor may be determined at block 76, wherein such determination might involve calculating a weighted row intensity sum for sensors in the row containing the selected sensor. Illustrated block 78 provides for determining a column intensity for the selected sensor, wherein such determination could involve calculating a weighted column intensity sum for sensors in the column containing the selected sensor. In one example, the row and column intensity sums include only sensors between the selected sensor and read circuitry of the touch panel. An intensity of the selected sensor can be adjusted at block 80 based on the row and column intensities. Block 82 provides for repeating the sensor selecting, row intensity determining, column intensity determining, and selected sensor adjusting for additional sensors in the array.

Figure 8:
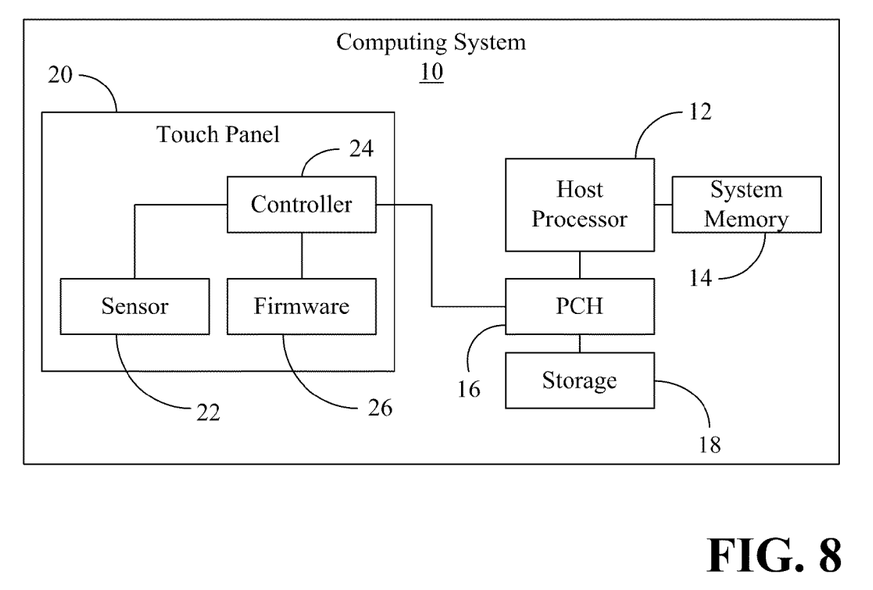
FIG. 8 is a block diagram of an example of a computing system according to an embodiment.

Turning now to FIG. 8, a computing system 10 is shown, wherein the system 10 may be part of a mobile platform such as a laptop, personal digital assistant (PDA), wireless smart phone, media player, imaging device, etc., or any combination thereof. The system 10 may also be part of a fixed platform such as a personal computer (PC), server, workstation, etc. The illustrated system 10 includes a host processor 12 that might include an integrated memory controller (not shown) that provides access to system memory 14, which could include dual data rate (DDR) synchronous dynamic random access memory (SDRAM, e.g., DDR3 SDRAM JEDEC Standard JESD79-3C, April 2008) modules. The modules of the system memory 14 may be incorporated into a single inline memory module (SIMM), dual inline memory module (DIMM), small outline DIMM (SODIMM), and so on. The processor 12 may also have one or more processor cores (not shown), where each core may be fully functional with instruction fetch units, instruction decoders, level one (L1) cache, execution units, and so on. In one example, the internal cache(s) of the processor 12 could be implemented in static RAM (SRAM). The processor 12 may also execute an operating system (OS) such as a Microsoft Windows, Linux, or Mac (Macintosh) OS, and various other software applications.

The illustrated processor 12 communicates with a platform controller hub (PCH) 16, also known as a Southbridge in certain systems. The PCH 16 may have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated PCH 16 is also coupled to one or more mass storage devices 18, which may include a hard drive, read only memory (ROM), optical disk, flash memory, etc. The PCH 16 could provide support for user interface devices such as a microphone, display, keypad, mouse, speakers, etc., in order to allow a user to interact with and perceive information from the system 10.

In particular, the PCH 16 may communicate with a touch panel 20 that has an array of capacitive sensors 22, a touch panel controller 24 and firmware 26. The controller 24 might be an embedded controller implemented in fixed-functionality hardware logic using circuit technology such as application specific integrated circuit (ASIC), complementary metal oxide semiconductor (CMOS) or transistor-transistor logic (TTL) technology, or any combination thereof. In the illustrated example, the firmware 26, which might be implemented as logic in programmable ROM (PROM) or flash memory, includes a set of adjustment module instructions which, if executed by the controller 24, cause the controller 24 to compensate each sensor in the array 22 for multi-touch signal bias drift, as already discussed. The adjustment module might also be implemented as fixed functionality hardware in the controller 24 or other appropriate processing component.

Figure 9:
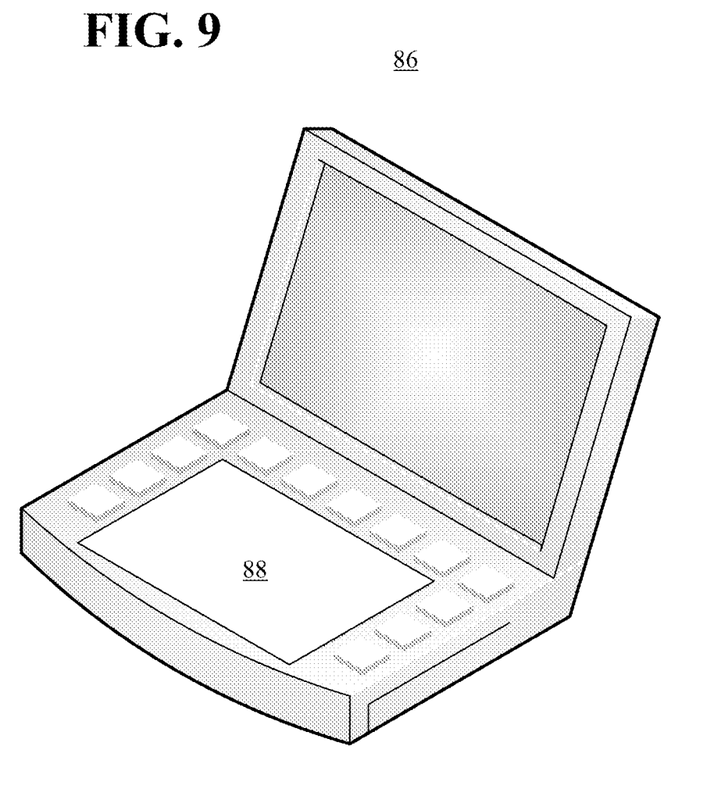
FIG. 9 is a perspective view of an example of a computing system having a notebook form factor and a touch panel according to an embodiment.

FIG. 9 shows a mobile computing system 86 having a housing with a notebook form factor, and a touch panel 88 coupled to a horizontal surface of the housing. As already noted, the touch panel 88 may include an array of capacitive sensors and an adjustment module to compensate each sensor in the array for multi-touch signal bias drift. In one example, a host processor of the system 86 may be configured to run a keyboard application process via the touch panel 88. Other processes might include OS navigation processes (e.g., touch computing to refresh the computing system), etc.

The above techniques may therefore solve a signal measurement deficiency encountered when building large capacitive touch panels such as those used for notebook size surfaces. In particular, the techniques can monitor a dynamically drifting signal bias established in the hardware scanning circuitry and adaptively adjust the signal-to-baseline offset of each touch panel sensor reading. This adaptive adjustment may be done based on row-column observations at other points of the panel that are known to bleed through the human body and distort the capacitive reading of interest. Doing so can enable the faded signal to be recovered and allows for substantially larger amounts of simultaneous contact areas to be supported (e.g., full-hand contact and/or multiple user contact, which may be typically encountered when using larger touch panels).

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   selecting a sensor in an array of capacitive sensors;
   determining a row intensity for the selected sensor, wherein the row intensity is determined based at least in part on a respective intensity associated with each of at least one additional sensor in a same row of the array as the selected sensor;
   determining a column intensity for the selected sensor, wherein the column intensity is determined based at least in part on a respective intensity associated with each of at least one additional sensor in a same column of the array as the selected sensor; and
   compensating the selected sensor for multi-touch signal bias drift, wherein the compensating includes adjusting an intensity of the selected sensor based at least in part on the row intensity and the column intensity.

2. The method of claim 1, further including:
- calculating a row intensity sum for sensors in the same row that includes the selected sensor to obtain the row intensity;
- calculating a column intensity sum for sensors in the same column that includes the selected sensor to obtain the column intensity; and
- adding the row intensity sum and the column intensity sum to the intensity of the selected sensor.

3. The method of claim 2, further including weighting individual row and column intensities based at least in part on a distance metric prior to calculating the row and column intensity sums.

4. The method of claim 3, wherein the distance metric provides a weight that is inversely proportional to distance.

5. The method of claim 2, wherein the row and column intensity sums include only sensors between the selected sensor and read circuitry of the touch panel.

6. The method of claim 1, further including repeating the sensor selecting, row intensity determining, column intensity determining, and selected sensor intensity adjusting for a plurality of sensors in the array.

7. A touch panel comprising:
- an array of capacitive sensors; and
- an adjustment module to compensate each sensor in the array for multi-touch signal bias drift, wherein the adjustment module is configured to:
- select a sensor in the array,
- determine a row intensity for the selected sensor, wherein the row intensity is determined based at least in part on a respective intensity associated with each of at least one additional sensor in a same row of the array as the selected sensor,
- determine a column intensity for the selected sensor, wherein the column intensity is determined based at least in part on a respective intensity associated with each of at least one additional sensor in a same column of the array as the selected sensor, and
- adjust an intensity of the selected sensor based at least in part on the row intensity and column intensity.

8. The touch panel of claim 7, wherein the adjustment module is configured to,
- calculate a row intensity sum for sensors in the same row that includes the selected sensor to determine the row intensity,
- calculate a column intensity sum for sensors in the same column that includes the selected sensor to determine the column intensity, and
- add the row intensity sum and the column intensity sum to the intensity of the selected sensor.

9. The touch panel of claim 8, wherein the adjustment module is configured to weight individual row and column intensities based at least in part on a distance metric prior to calculation of the row and column intensity sums.

10. The touch panel of claim 9, wherein the distance metric provides a weight that is inversely proportional to distance.

11. The touch panel of claim 8, further including read circuitry, wherein the row and column intensity sums are to include only sensors between the selected sensor and the read circuitry.

12. The touch panel of claim 7, wherein the adjustment module is configured to repeat the sensor selection, row intensity determination, column intensity determination and selected sensor intensity adjustment for a plurality of sensors in the array.

13. A computing system comprising:
- a housing having a notebook form factor; and
- a touch panel coupled to a horizontal surface of the housing, the touch panel including an array of capacitive sensors and an adjustment module to compensate each sensor in the array for multi-touch signal bias drift, wherein the adjustment module is configured to:
- select a sensor in the array,
- determine a row intensity for the selected sensor, wherein the row intensity is determined based at least in part on a respective intensity associated with each of at least one additional sensor in a same column of the array as the selected sensor,
- determine a column intensity for the selected sensor, wherein the column intensity is determined based at least in part on a respective intensity associated with each of at least one additional sensor in a same column of the array as the selected sensor, and
- adjust an intensity of the selected sensor based at least in part on the row intensity and column intensity.

14. The computing system of claim 13, wherein the adjustment module is configured to,
- calculate a row intensity sum for sensors in the same row that includes the selected sensor to determine the row intensity,
- calculate a column intensity sum for sensors in the same column that includes the selected sensor to determine the column intensity, and
- add the row intensity sum and the column intensity sum to the intensity of the selected sensor.

15. The computing system of claim 14, wherein the adjustment module is configured to weight individual row and column intensities based at least in part on a distance metric prior to calculation of the row and column intensity sums.

16. The computing system of claim 15, wherein the distance metric provides a weight that is inversely proportional to distance.

17. The computing system of claim 16, wherein the touch panel further includes read circuitry, and the row and column intensity sums are to include only sensors between the selected sensor and the read circuitry.

18. The computing system of claim 14, wherein the adjustment module is configured to repeat the sensor selection, row intensity determination, column intensity determination and selected sensor intensity adjustment for a plurality of sensors in the array.

* * * * *

UNITED STATES PATENT AND TRADEMARK OFFICE
CERTIFICATE OF CORRECTION

PATENT NO.        : 8,698,015 B2                                Page 1 of 1
APPLICATION NO.   : 12/642090
DATED             : April 15, 2014
INVENTOR(S)       : Steven S. Bateman et al.

It is certified that error appears in the above-identified patent and that said Letters Patent is hereby corrected as shown below:

In the Claims

In column 8, line 47, in claim 17, delete "claim 16," and insert -- claim 14, --, therefor.

In column 8, line 51, in claim 18, delete "claim 14," and insert -- claim 13, --, therefor.

Signed and Sealed this
Twenty-second Day of July, 2014

Michelle K. Lee
*Deputy Director of the United States Patent and Trademark Office*